Oct. 27, 1931.  J. B. SHAINLINE  1,829,064
AIRCRAFT PROPELLING MEANS
Filed Sept. 21, 1929  2 Sheets-Sheet 1
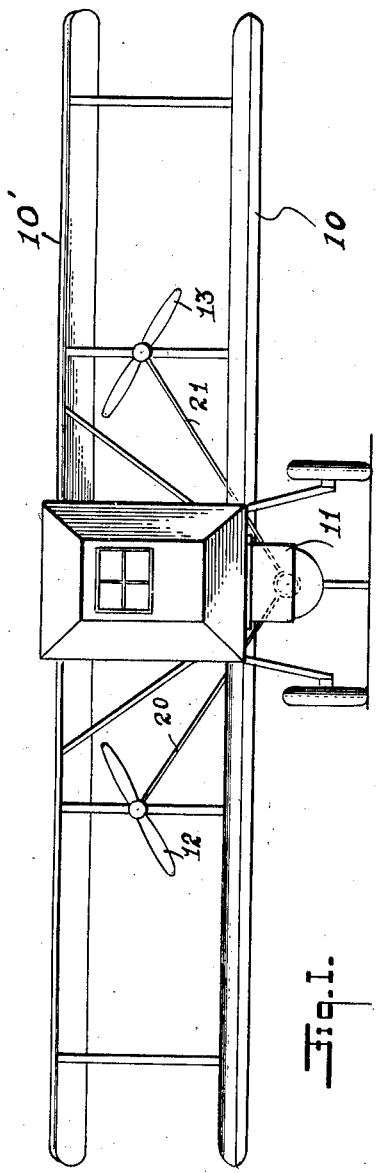
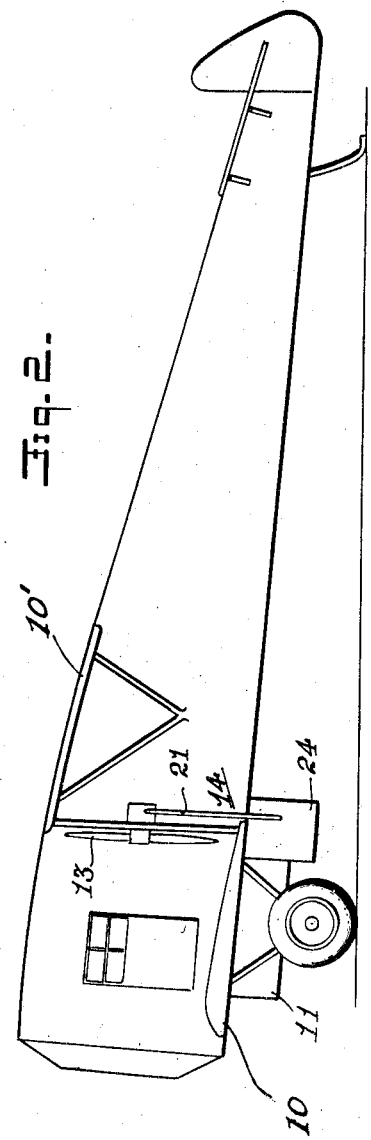
INVENTOR
Joseph B. Shainline
BY
Joshua R. H. Potts
ATTORNEY Oct. 27, 1931.  J. B. SHAINLINE  1,829,064
AIRCRAFT PROPELLING MEANS
Filed Sept. 21, 1929   2 Sheets-Sheet 2
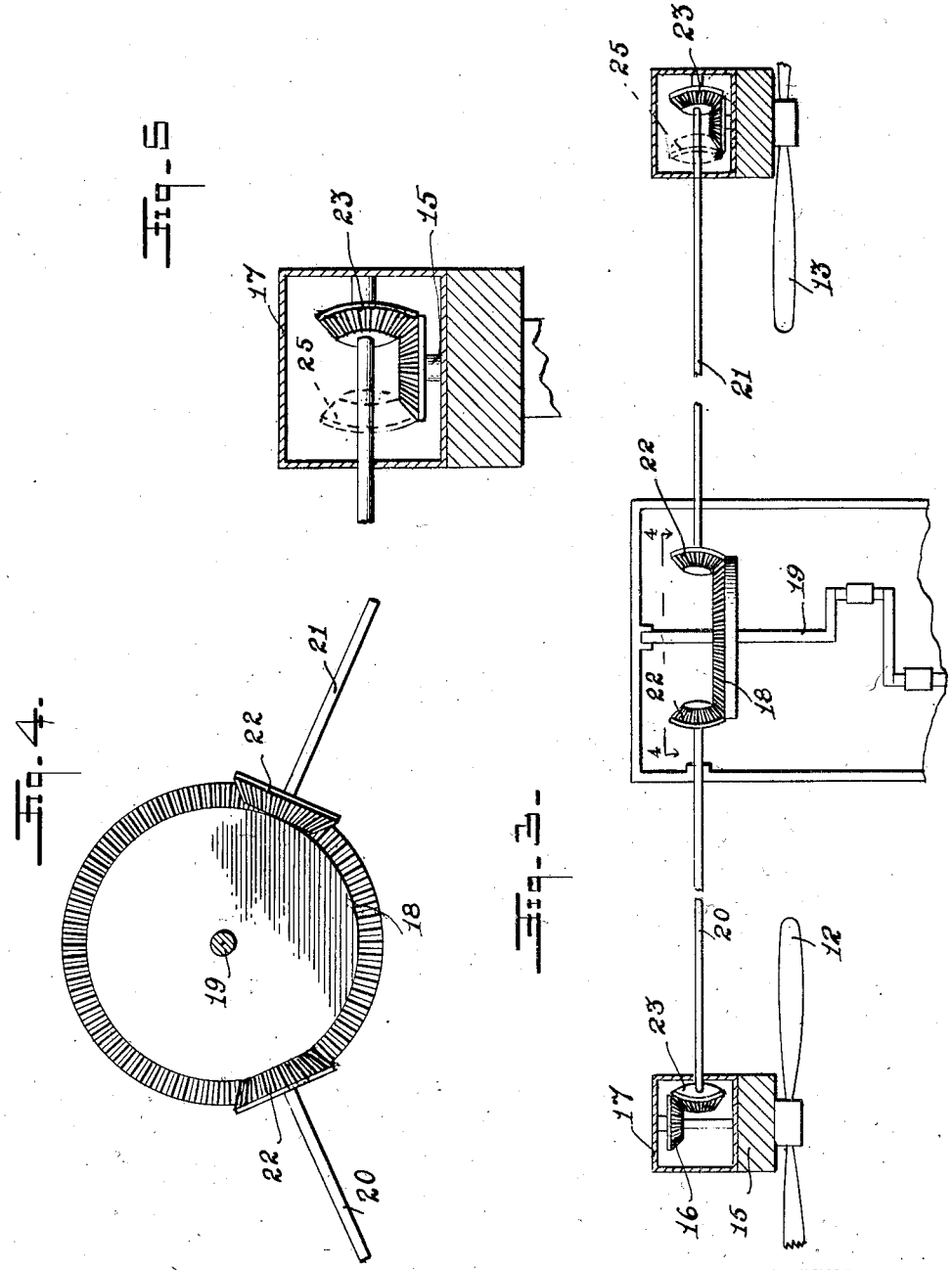
INVENTOR
Joseph B. Shainline
BY
Joshua R. H. Potts
ATTORNEY Patented Oct. 27, 1931

1,829,064

UNITED STATES PATENT OFFICE

JOSEPH B. SHAINLINE, OF NORRISTOWN, PENNSYLVANIA, ASSIGNOR OF ONE-HALF TO HAROLD SLEMMER, OF NORRISTOWN, PENNSYLVANIA

AIRCRAFT PROPELLING MEANS

Application filed September 21, 1929. Serial No. 394,187.

This invention relates to aircraft and more particularly to an improved means for propelling the same.

One of the most vital problems in commercializing aircrafts is the provision of a more durable and reliable propelling means. The aircrafts of today are provided with one or more motors and propellers wherein the motor and propeller are constructed as a unit, the propeller being fixed rigidly to the crank shaft of the motor, and of course, the propeller turns the same number of revolutions as the motor.

The above necessitates the motor being run at a high speed all of the time in order to attain speed and lifting power. This of course, shortens the life of the motor and necessitates a very efficient cooling system. Many of the unsuccessful long distance flights have been due to the failure of the cooling system. Probably the most numbered of all unsuccessful long distance flights are due to the high speed that the motor is required to maintain.

One objects of this invention is to provide a means for propelling an aircraft wherein the speed of the motor is less than the speed of propeller or propellers driven thereby.

Another object is to provide a single power plant for driving a plurality of propellers and means for connecting the power plant with the propellers.

A further object is to position the power plant in such a position on the craft that it will be exposed to the air for cooling purposes.

A further object of the invention is to provide an aircraft having upper and lower wing structures spaced apart not only vertically but staggered horizontally.

A further object of the invention is to provide an aircraft having a lower wing located in front of the upper wing by substantially the width of the wing.

A further object of the invention is to provide an aircraft having a lower wing in advance of the upper wing by substantially the width of the wing with a propeller between the wings and in position to project air currents against the under side of the upper wing only.

According to the invention, I provide a power plant of any suitable kind such as an internal combustion engine having a main gear fixed to one end of its crankshaft, propellers spaced apart and on opposite sides of the fuselage or main body of the aircraft and upon planes substantially lying between and supported by the wings which are staggered and means for connecting the propellers with the power plant, the said means being constructed so as to give the propellers a greater number of revolutions relative to the revolutions of the power plant and to move the air into contact with the under sides of the wings to augment the lift.

The drawings which are more or less diagrammatic illustrate an embodiment of this invention and the views therein are as follows:—

Fig. 1 is a front view of an aircraft embodying the invention.

Fig. 2 is a side view of an aircraft embodying the invention.

Fig. 3 is a plan view of the propelling means.

Fig. 4 is an enlarged view taken along the line 4—4 of Fig. 3.

Fig. 5 is an enlarged detail view of one of the gear cases.

The fuselage of the aircraft which forms the subject matter of this application is of substantially the usual and ordinary type but the wings are arranged with the lower wing 10 substantially the width of the wing in advance of the upper wing 10'.

The propelling means consists in general of a power plant 11, propellers 12 and 13, and means represented in its entirety by 14 for connecting the power plant with the propellers.

The power plant may be an internal combustion engine of any suitable type and designed to develope sufficient power to drive the propellers at a greater number of revolutions than the revolutions of the power plant.

The propellers may be of any approved type and if desired may have opposite pitch one to the other. The propellers are supported by the wings in any convenient manner not shown. Each of the propellers are provided with a shaft 15, having a gear 16, fixed to the end thereof and a gear case 17.

The means 14 (see Fig. 3) consists of a bevelled main gear 18 fixed to one end of the crank shaft 19 of the power plant, driving shafts 20 and 21 having bevelled pinions 22 and 23 fixed to their opposite ends. The pinions 22 are adapted to mesh with the gear 18 on opposite sides. Pinions 23 are adapted to mesh with the gears 16. The gears 16 and pinions 23 are preferably of the same ratio, the gear 18 and the pinions 22 may be designed to have any desired ratio.

The power plant 11, is provided with a gear case 24. The gear case 24 and the gear cases 17 are provided with suitable openings having bearings therein for receiving and supporting the driving shafts 20 and 21.

Fig. 3 shows the means 14 connected up for driving propellers 12 and 13 in the same direction. However, if it is desired to drive propellers in the opposite direction it is only necessary to change the pinions 23 associated with the propeller 13 to the position indicated by the dotted lines 25.

It can be seen from the above that the propellers may attain the desired revolutions for cruising without running the motor at a high rate of speed. It will also be seen that by reason of the location of the propellers 12 and 13 substantially at the fore edge of the upper wing and the aft edge of the lower wing, the air discharge from the propeller will impinge upon the under side of the inclined wing 10', and not only exert force for the advancement of the craft as an entirety, but will exert a lifting force upon the under side of the wing 10'. Operating as it does substantially in the rear and above the lower wing 10, the attenuation of the air from the operation of the propeller will also tend to utilize unbalanced lifting effect of the air upon the under side of this wing.

While I have described one embodiment of this invention in connection with a cabin plane, the same principles may be applied to buoyant and semi-buoyant aircraft.

Of course, the aircraft propelling means illustrated may be modified and changed in various ways without departing from the invention herein set forth and hereafter claimed.

The invention is hereby claimed as follows:

An aircraft comprising a fuselage, a power plant, wings adjacent to the lower forward parts of the fuselage and extending in substantial alinement upon opposite sides thereof, wings adjacent to the upper limits of the fuselage and extending in substantial alinement upon opposite sides thereof, said upper wings having their forward edges approximately coinciding with a vertical plane through the rear edges of the lower wings, propellers journaled upon opposite sides of the fuselage to rotate approximately in said plane, their orbits being less in diameter than the vertical distance between the wings, and means to drive the propellers from the power plant.

In testimony whereof I have signed by name to this specification.

JOSEPH B. SHAINLINE.